(12) United States Patent
Copland et al.

(10) Patent No.: US 8,245,147 B2
(45) Date of Patent: Aug. 14, 2012

(54) SYSTEM AND METHOD FOR REORDERING A USER INTERFACE

(75) Inventors: Trevor Ashton Danger Benjamin Copland, San Francisco, CA (US); Stephen Hayden Cotterill, San Jose, CA (US)

(73) Assignee: Apple Inc., Cupertino, CA (US)

( * ) Notice: Subject to any disclaimer, the term of this patent is extended or adjusted under 35 U.S.C. 154(b) by 454 days.

(21) Appl. No.: 12/496,330

(22) Filed: Jul. 1, 2009

(65) Prior Publication Data
US 2011/0004837 A1    Jan. 6, 2011

(51) Int. Cl.
*G06F 3/00* (2006.01)
*G06F 3/048* (2006.01)

(52) U.S. Cl. .......................... 715/765; 715/762; 715/841

(58) Field of Classification Search .......... 715/723–726, 715/762, 765, 779, 828, 834
See application file for complete search history.

(56) References Cited

U.S. PATENT DOCUMENTS

| | | | |
|---|---|---|---|
| 7,266,777 B2 * | 9/2007 | Scott et al. ..................... | 715/762 |
| 2004/0230947 A1 * | 11/2004 | Bales et al. ................... | 717/110 |
| 2005/0198581 A1 | 9/2005 | Soderberg et al. | |
| 2006/0136833 A1 | 6/2006 | Dettinger et al. | |
| 2008/0235610 A1 * | 9/2008 | Dettinger et al. ............. | 715/769 |

* cited by examiner

*Primary Examiner* — Weilun Lo
*Assistant Examiner* — Truc Chuong
(74) *Attorney, Agent, or Firm* — Novak Druce + Quigg LLP (57) ABSTRACT

Disclosed herein are systems, computer-implemented methods, and tangible computer-readable storage media for customizing a user interface. The method displays an interface to a user. In the interface, a slice has interface elements, a stack has a group of slices, a window has a group of stacks, and each interface element is associated with a segment of a highly structured document. The interface includes a panel having one or more containers, each container representing one stack, and one or more tokens, each token representing one slice. The method relocates at least one token to a different location in the container based on user input, displays in the panel a preview based on the relocated token, generates a user interface workflow based on the one or more containers and the relocated token, and displays the generated user interface workflow.

25 Claims, 12 Drawing Sheets

Order Form — 300

Contact — 302
- Name: Huck Finn — 304
- Email: hfinn@apple.com — 306
- Phone: 408.996.1010

Product — 308
- Model: iPod
- Size: 8GB
- Part Number: M001

Personalization — 310
- Engraving: Congratulations
- Color: ○ Black
- ● White

```
                          404              408  406
                           |                |    |
┌─────────────────────────────────────────────────┐
│ ○○○            Order Form                       │
│ ┌─────────────────────────────┬────────┬───┬──┐ │ ─ 402
│ │Contact, Product & Personalization│Billing │ ☆ │  │ │
│ ├─────────────────────────────┴────────┴───┴──┤ │
│ │  Contact                                     │ │
│ │         Name:  [Huck Finn              ]     │ │
│ │        Email:  [hfinn@apple.com        ]     │ │
│ │        Phone:  [408.996.1010           ]     │ │
│ ├──────────────────────────────────────────────┤ │
│ │  Product                                     │ │
│ │        Model:  [iPod              ▽]         │ │
│ │         Size:  [8GB               ▽]         │ │
│ │  Part Number:  M001                          │ │
│ ├──────────────────────────────────────────────┤ │
│ │  Personalization                             │ │
│ │    Engraving:  [Congrats    ]                │ │
│ │        Color:  ○ Black                       │ │
│ │                ⦿ White                       │ │
│ └──────────────────────────────────────────────┘ │
└─────────────────────────────────────────────────┘
```
410

FIG. 5

```
┌─────────────────────────────────────────────────┐
│ ○○○            Order Form                       │
│ ┌─────────────────────────────┬────────┬───┬──┐ │ ─ 412
│ │Contact, Product & Personalization│Billing │ ☆ │  │ │
│ ├─────────────────────────────┴────────┴───┴──┤ │
│ │  Billing                                     │ │
│ │   Credit Card: [Mastercard          ]        │ │
│ │        Number: [4234574568975       ]        │ │
│ │       Expires: [2/09                ]        │ │
│ │          Name:  Huck Finn                    │ │
│ └──────────────────────────────────────────────┘ │
└─────────────────────────────────────────────────┘
```
414

Order Form — 702

Contact
- Name: Huck Finn
- Email: hfinn@apple.com
- Phone: 408.996.1010

Product
- Model: iPod
- Size: 8GB
- Part Number: M001

Personalization
- Engraving: Congrats
- Color: ○ Black
- ◉ White

FIG. 11

Bonus Form — 704

Employee
- Name: Bob Worker
- ID: 49585
- Manager: P.H. Boss

Bonus Amount
- Type: Hardware
- Model: MM005 LL/A
- Value: $1000 USD

FIG. 12

706 — Bonus Form

Employee
- Name: Irina Klubnikova
- ID: 85647
- Manager: Josh Hardin

Bonus Amount
- Type: Hardware
- Model: M9856 LL/A
- Value: $190 USD

SYSTEM AND METHOD FOR REORDERING A USER INTERFACE

BACKGROUND

1. Technical Field

The present disclosure relates to dynamic user interfaces and more specifically to reordering groups of user interface elements accessing a highly structured document.

2. Introduction

A graphical user interface can display input controls (such as fields, menus, radio buttons) and fixed data (such as labels or values). In many cases these elements relate to other elements, such as the relation between a person and their telephone number. This related information can co-exist on a single interface with other items which can be similarly grouped by their relation to other elements. For example, a "contact" grouping includes fields for a name and phone number. A "product" grouping includes fields for the model, size, or other specifications related to the product.

User interface designers separate these groups of data into individual sections to facilitate organization and instill an understanding of their interrelated nature in users. Various graphical cues exist for grouping similar items, including separator lines, columns of related items, and clusters of related items in distinct sections of a display. Interface slices are often applied to the latter method. Slices are a portion of a user interface where the user interface elements within the slice are related to each other.

Figure 2:
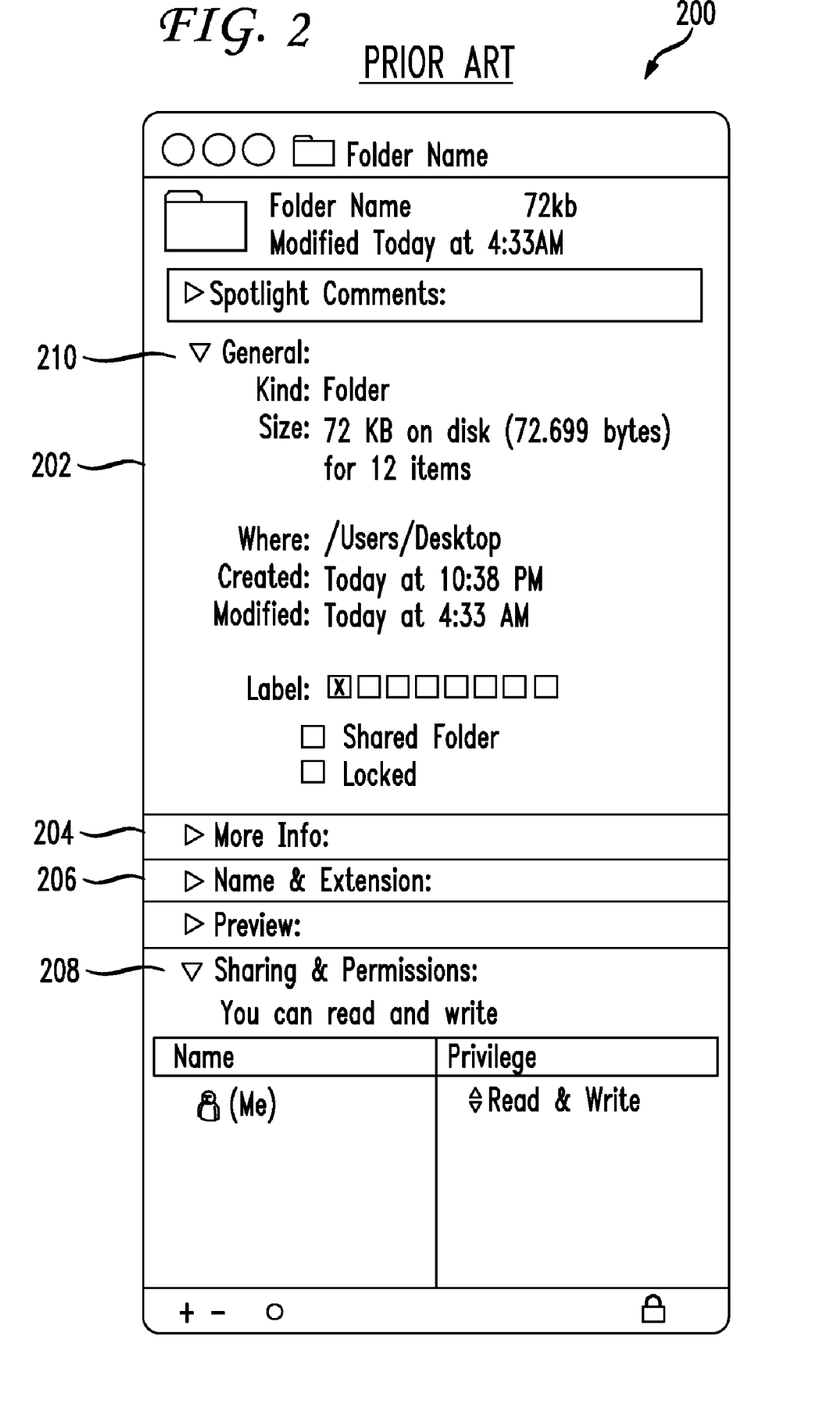
FIG. 2 illustrates an exemplary static approach to displaying slices.

FIG. 2 illustrates one exemplary static approach 200 to slices. FIG. 2 shows sections labeled "General" 202, "More Info" 204, "Name & Extension" 206, and "Sharing & Permissions" 208 among others. Each of these sections illustrates the general concept of a slice. The order of the slices in this example is fixed. This illustration includes triangles or arrows 210 to collapse or expand sections. This approach can reduce the graphical footprint of the interface and allow the user to view only certain slices.

However, this approach requires each user to interact with the same interface regardless of their preference or focus. For example, a user who primarily uses the "Sharing & Permissions" section 208 located at the bottom of the window must navigate past various other sections in order to reach the "Sharing & Permissions" section 208. The triangles or arrows 210 mitigate some of this problem by collapsing undesired portions, but also limit the user in that they are unable to see other information when necessary without performing an action to disclose the section. This is a disadvantage when the user wants to see a different section of the window often, though it is not their primary focus. This approach also requires application designers to provide a one-size-fits-all interface calculated to probably suit most users' expected needs, but cannot possibly suit all users' actual needs.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

One computer-implemented method embodiment displays an interface to a user, wherein a slice includes interface elements having a relationship to other interface elements within the slice, wherein a stack includes a group of slices, wherein a window includes a group of stacks, and wherein each interface element is associated with a segment of a highly structured document. The interface includes a panel having one or more containers, each container representing one stack, and one or more tokens, each token representing one slice. The method relocates at least one token to a different location in the container based on user input, displays in the panel a preview based on the relocated token, generates a user interface workflow based on the one or more containers and the relocated token, and displays the generated user interface workflow. The method can further generate additional user interface workflows based on additional input. Additional user interface workflows can be associated with a user ID or with a user class. The step of generating the user interface workflow can involve modifying a default or base workflow based on the group of slices. One slice can include a group of sub-slices. The sub-slices can be constrained to a single slice.

One tangible computer-readable storage medium embodiment stores a computer program having instructions for controlling a processor to customize a user interface. The instructions include displaying an interface to a user, wherein a slice includes interface elements having a relationship to other interface elements within the slice, wherein a stack includes a group of slices, wherein a window includes a group of stacks, and wherein each interface element is associated with a segment of a highly structured document. The interface includes a panel having one or more containers, each container representing one stack, and one or more tokens, each token representing one slice. The instructions go on to relocate at least one token to a different location in the container based on user input, display in the panel a preview based on the relocated token, generate a user interface workflow based on the one or more containers and the relocated token, and display the generated user interface workflow. The instructions can provide for creating or deleting a container in the panel based on additional user input. Additional user input can delete or create a new token and, if creating a new token, insert a new segment in the highly structured document corresponding to the new token. Stacks can include slice-based as well as non-slice-based user interface elements. Certain related slices can be locked such that the locked slices must be placed together in the same stack.

A system embodiment allows for customizing a user interface. The system includes a processor and various modules configured to control the processor to perform certain actions. The system includes a display module to display an interface to a user, wherein a slice includes interface elements having a relationship to other interface elements within the slice, wherein a stack includes a group of slices, wherein a window includes a group of stacks, and wherein each interface element is associated with a segment of a highly structured document. The interface includes a panel having one or more containers, each container representing one stack, and one or more tokens, each token representing one slice. The system also includes a relocation module configured to control the processor to relocate at least one token to a different location in the container based on user input. Some containers can hold up to a maximum number of slices. The display module further displays in the panel a preview based on the relocated token in real time. A generation module generates a user interface workflow based on the one or more containers and the relocated token. In one aspect, the generation module does not include empty containers in the user interface workflow.

The display module further displays the generated user interface workflow and a real time preview of the generated user interface workflow. The system can include a tab smoothing module to automatically update a tab order of slices based on slices' graphical layout. For example, if slices are reordered then the sequence from one input field to the next will flow in a nonintuitive order, such as skipping over a field immediately below, skipping to a field above, or the sequence can appear to end while other unfilled fields remain. To resolve this issue when reordering slices, the system can generate a new flow for the input fields (such as a tab order) to direct the user from one input field to the following input field or to some other input field in accordance with convention, a graphical user interface guideline, or other conditions. The sequence can be circular. The input sequence flow can be reordered within a slice, within a stack, or within any other segment of the highly structured document.

Another system embodiment displays a customized user interface. The system includes a processor and various modules configured to control the processor. The system includes a retrieval module to retrieve at least one portion of a highly structured document, and a customized user interface workflow associated with the highly structured document and with a user, a parser module to parse the retrieved at least one portion of the highly structured document based on the customized user interface workflow, a generation module to generate a customized user interface based on the parsed at least one portion of the highly structured document, and a user interface module to display the customized user interface to the user and receive user input interacting with the displayed customized user interface. The system can include an authentication module configured to control the processor to authenticate the user and allow access to the highly structured document based on user authentication. The system can also include a monitoring module to monitor a user history, and a suggestion module to suggest changes to the customized user interface workflow associated with the user based on the user history. The system can suggest changes based on metrics reflecting interface efficiency. The customized user interface workflow includes duplicate entries of a same slice in different locations in the customized user interface. The system can retrieve the customized user interface workflow from a local device or a remote device.

A user can change the order and location of slices by moving tokens representing those slices within a configuration panel. In one aspect, the method preserves this configuration such that when the user returns to this window the slices are displayed in the specified order and location.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
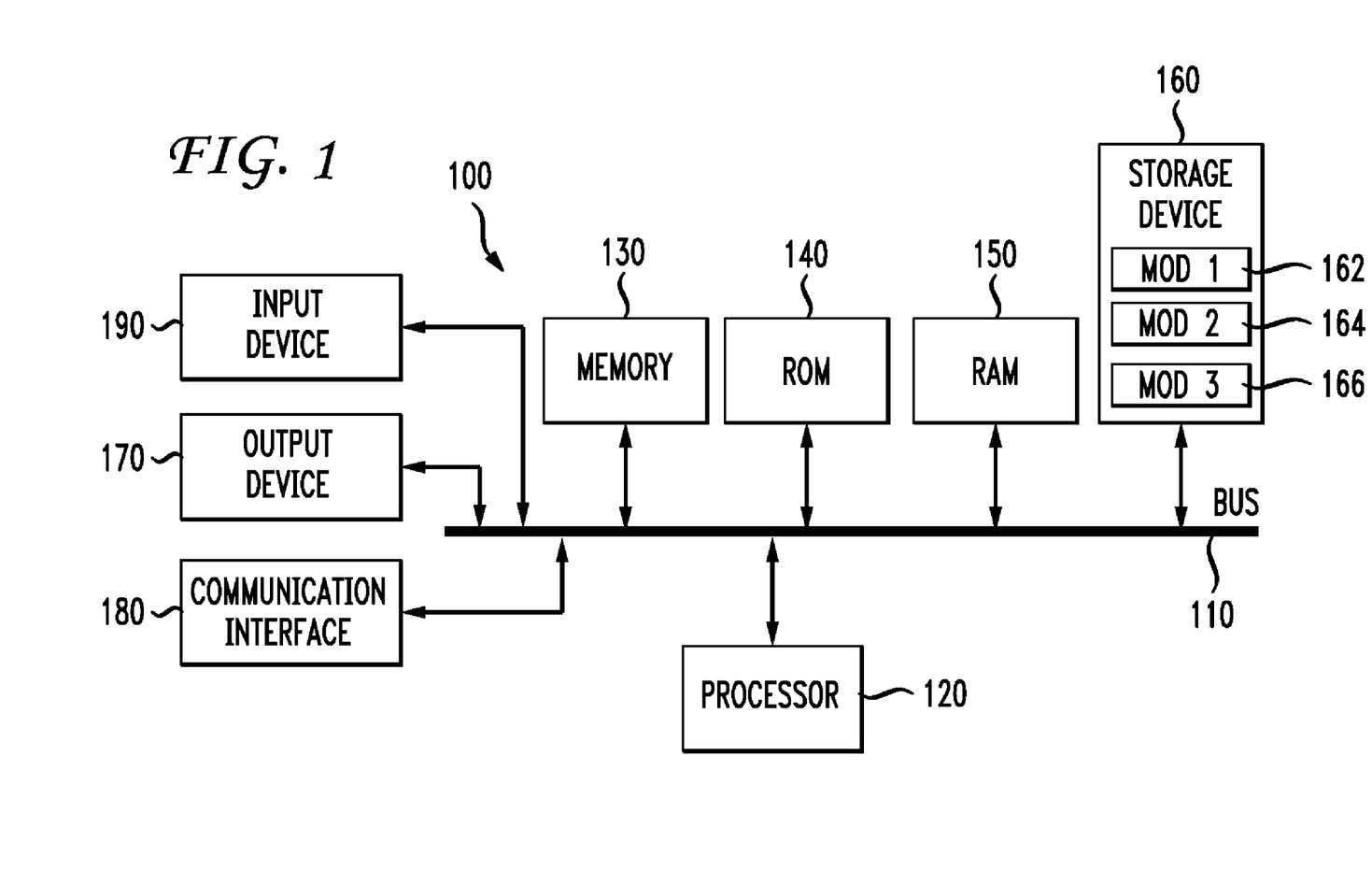
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120.

Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 3:
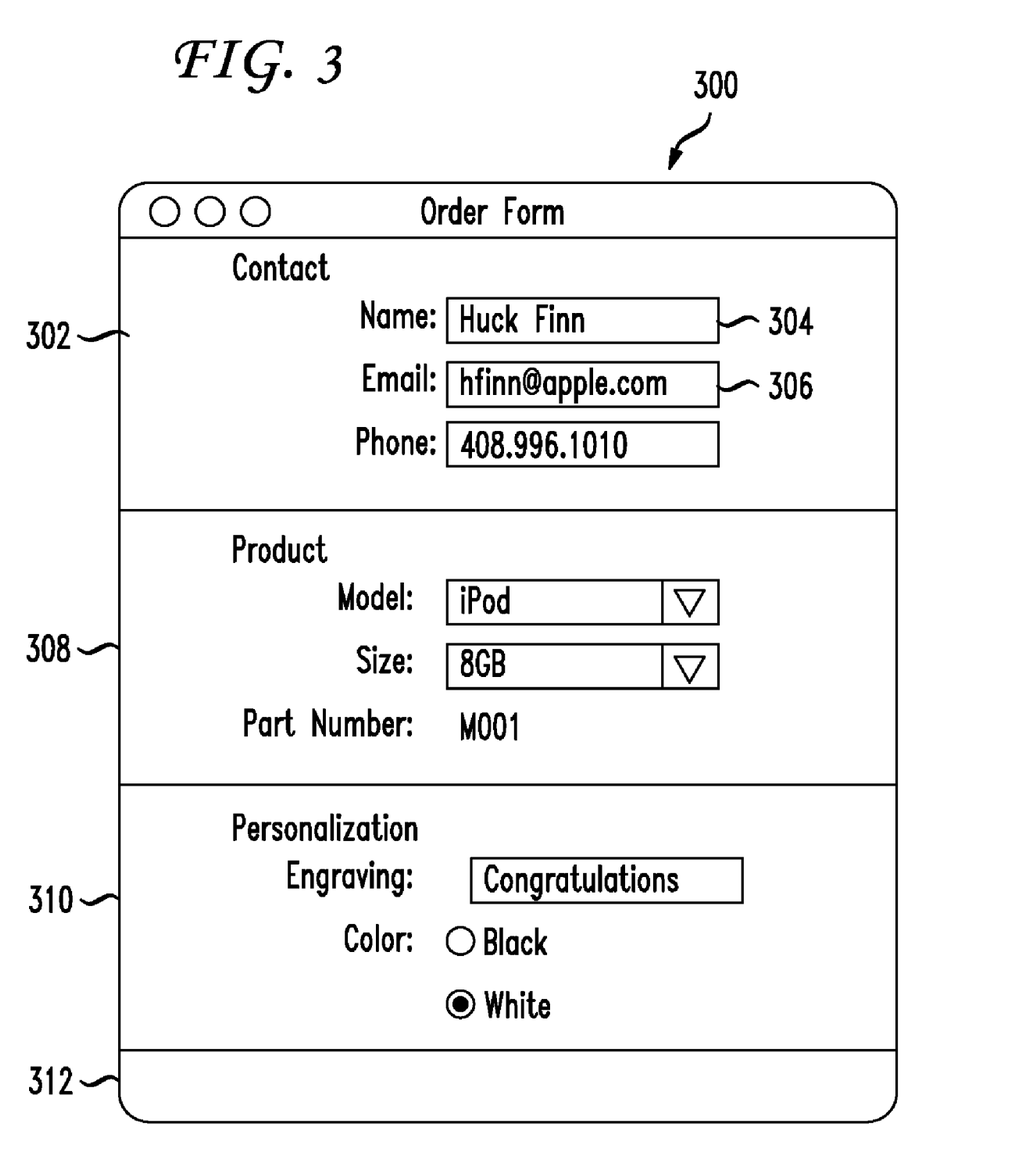
FIG. 3 illustrates multiple interface elements grouped into slices based on a logical grouping and relation to each other.

Having disclosed some fundamental hardware components which may practice one or more steps of the method embodiment, the disclosure turns to figures illustrating example operations of a system configured to practice the method. First, FIG. 3 illustrates a window 300 having multiple interface elements grouped into slices based on a logical grouping and relation to each other. The example window 300 shown is part of a process to order an Apple iPod, but the same principles apply equally to virtually any user interface on any computing system. This example user interface window displays groups of data and user interface elements as slices 302, 308, 310. The Contact slice 302 contains text fields for Name 304 and E-mil 306 which relate to other elements in the Contact slice 302. Other slices shown are Product 308 and Personalization 310. Separate slices 302, 308, 310 represent groups of similar elements based on their relationship to each other. A window can display only slices or it can also contain other sections 312 which are not part of a slice.

Figure 4:
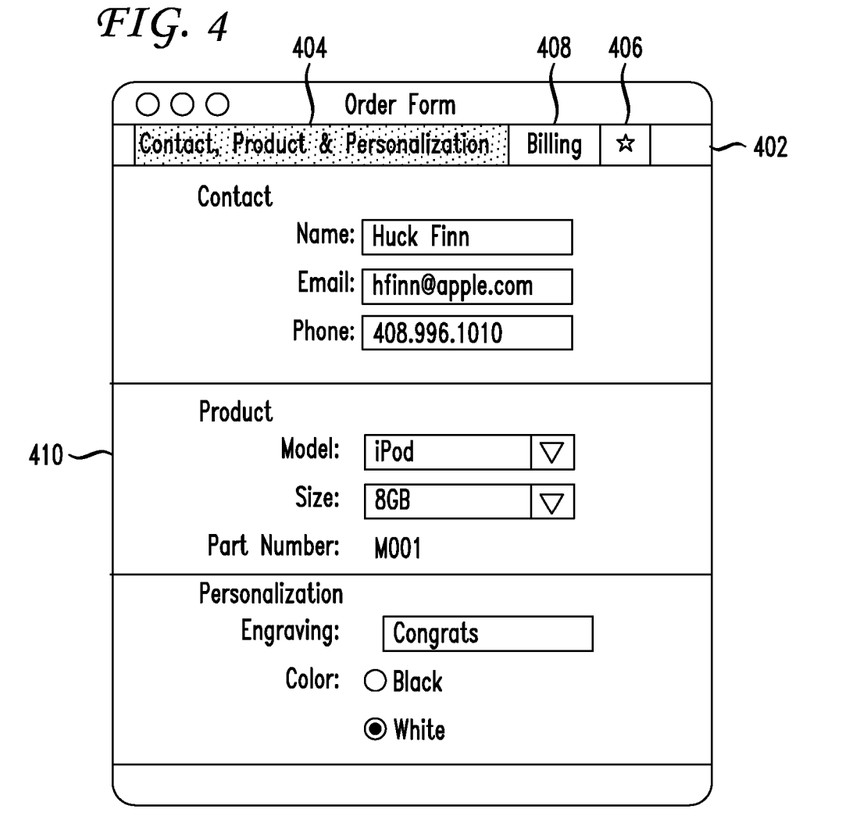
FIG. 4 illustrates a sample workflow having two stacks of slices.
Figure 5:
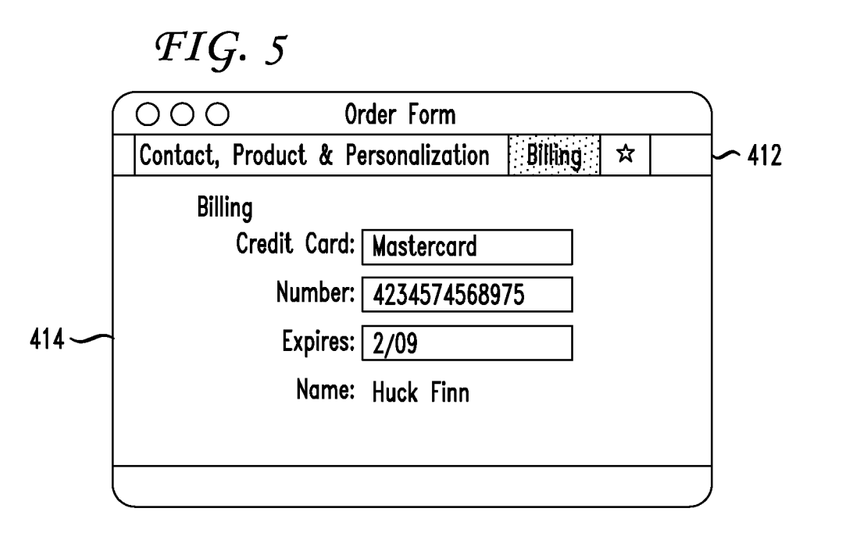
FIG. 5 illustrates a sample workflow having two stacks of slices.

FIGS. 4 and 5 illustrate a sample workflow having two stacks of slices. A stack of slices is a group of slices that appear at the same time on the same window. In this example, the workflow includes two windows 410, 414. Each of these windows contains a stack of slices. The first stack 410 contains three slices: Contact, Product, and Personalization. The second stack 414 only contains a single slice: Billing. A user can navigate between stacks by using a bar 402 such as a segmented control in Mac OS X, a series of matrix buttons, or other suitable control interface. The bar can display a highlighted label 404 or other icon 406 to indicate slices in each stack. Either the user or the application can specify these labels and/or icons. When the user selects a different stack 408 using the bar 402, the window displays the contents of the selected stack in the view area 414. FIG. 5 illustrates the window when the billing stack is selected in the bar 412. In some cases, slices can be locked together, meaning that when one moves, the other moves with it automatically. A user can lock slices together or the system can automatically lock related slices together and provide a warning if the user unlocks them.

Figure 6:
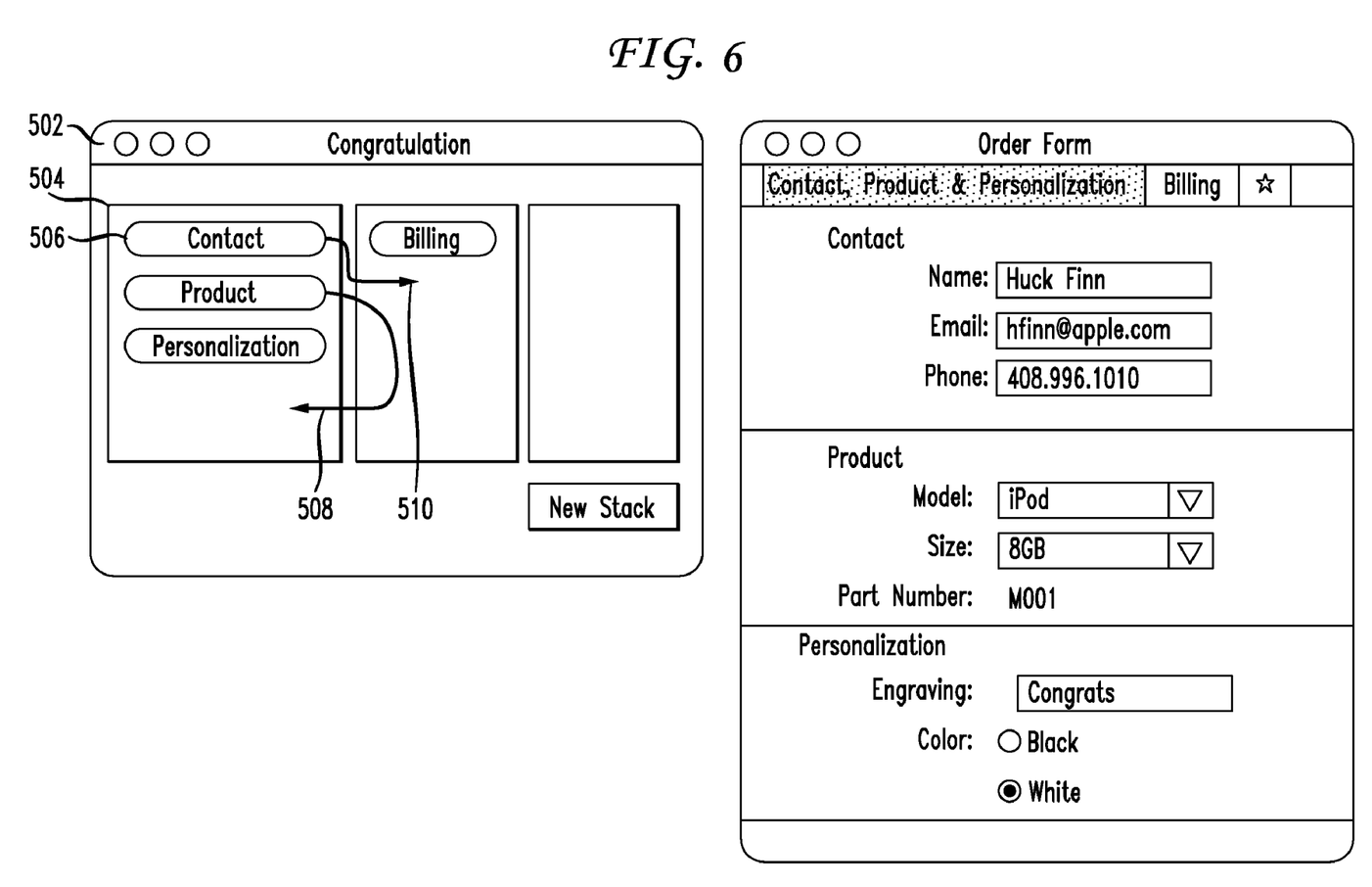
FIG. 6 illustrates an exemplary configuration panel with tokens and the resulting changes made by moving tokens within stacks.
Figure 7:
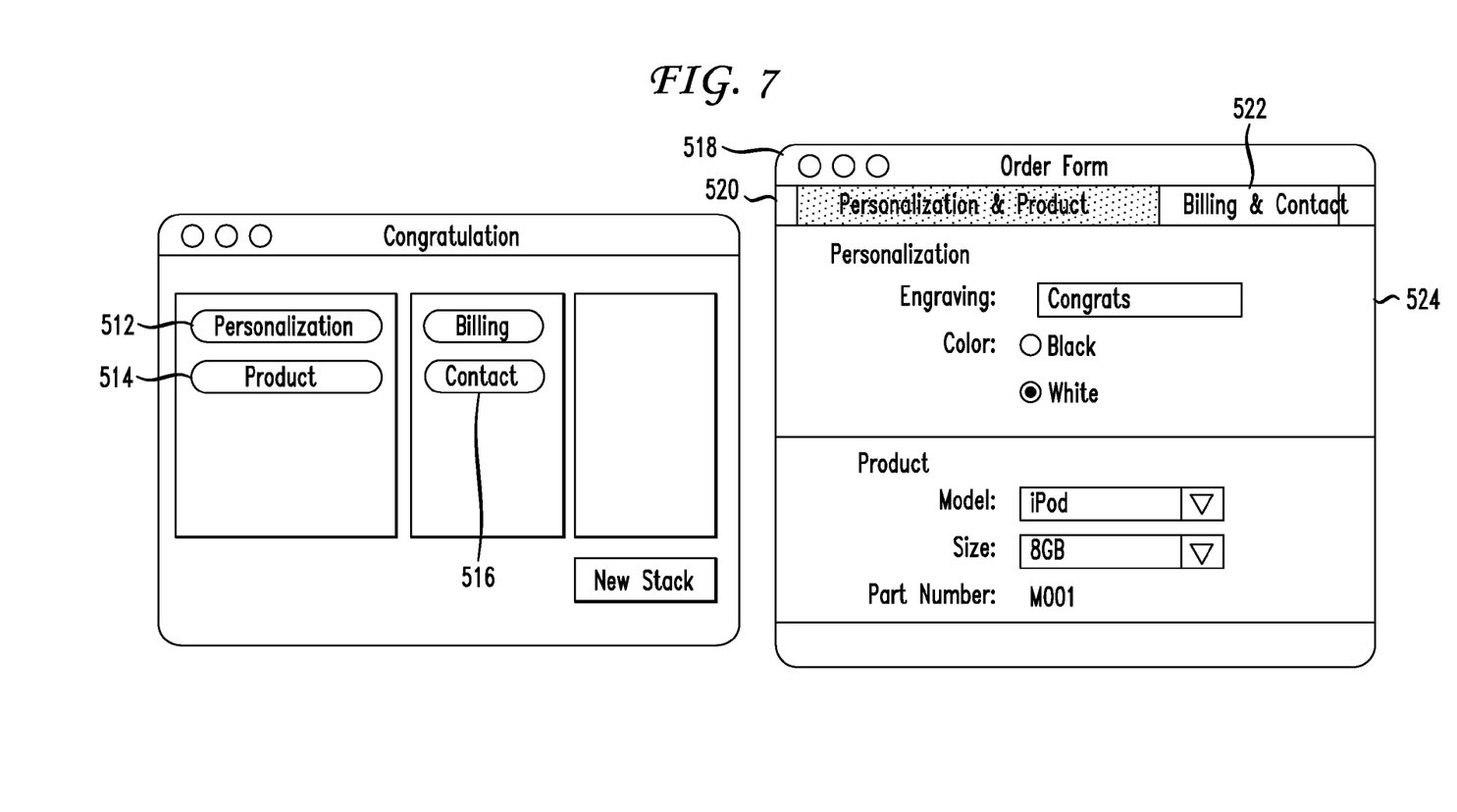
FIG. 7 illustrates an exemplary configuration panel with tokens and the resulting changes made by moving tokens within stacks.

FIGS. 6 and 7 illustrate an exemplary configuration panel with tokens and the changes in the resultant user interface made by moving tokens within stacks. A user can specify the location of slices (represented by tokens 506) in each stack (represented by a container 504) within the window a panel 502. The user can move tokens vertically 508 (i.e. within the same container 504), or horizontally 510 (i.e. between containers). FIG. 6 illustrates two changes, moving the Product token down 508 and moving the Contact token to the right 510. FIG. 7 illustrates the resulting changes in the user interface after the tokens are moved as shown with arrows 508, 510 in FIG. 6. The Personalization token 512 is now located at the top of the stack and, as moved by the user, the Product token 514 is at the bottom of the stack. The Contact token 516 is now located in the second stack, below the Billing token, as the user dropped it in the empty space at the bottom of that container. The changes made in the configuration window 502 can be reflected in real-time in the document window 518 and in the configuration window 502. The navigation control 520 updates the labels 522 of the control appropriately to reflect the slices contained within the stack. The navigation control 520 automatically generates a name based on the slices in the stack it represents and can show text or icons to represent the slices it contains. The user can specify the label. Label contents, such as text or an icon, can determine a specific label to use based on special logic if the stack contains a specific list of slices. Labels can have a default name that describes slices in the stack, which the system can automatically update as the user modifies and arranges slices. For example, the label default can be "Personal Information" because the slices correspond to First Name, Last Name, and Address. As the user includes additional slices, such as Credit Card Number, Shipping Address, and Shipping Method, the system can intelligently determine that the label "Personal Information" should be relabeled as "Shipping Information" and update the label accordingly. Additionally, the Personalization slice 524 is now displayed above the Product slice. As the user arranges slices, the system can automatically set the tab order of user interface elements in the slices so that the tab order flows from the last element of one slice to the first element of the following slice. The system can automatically update this and other user interface nuances to present a consistent experience for users.

In some cases, a container can hold only a limited number of slices. The number of slices can be automatically determined or set in advance by a human. For instance, the maximum dimensions of the container can dictate how many slices the container can hold. In other situations, a human user interface designer can limit each container to an arbitrary maximum number of slices.

Figure 8:
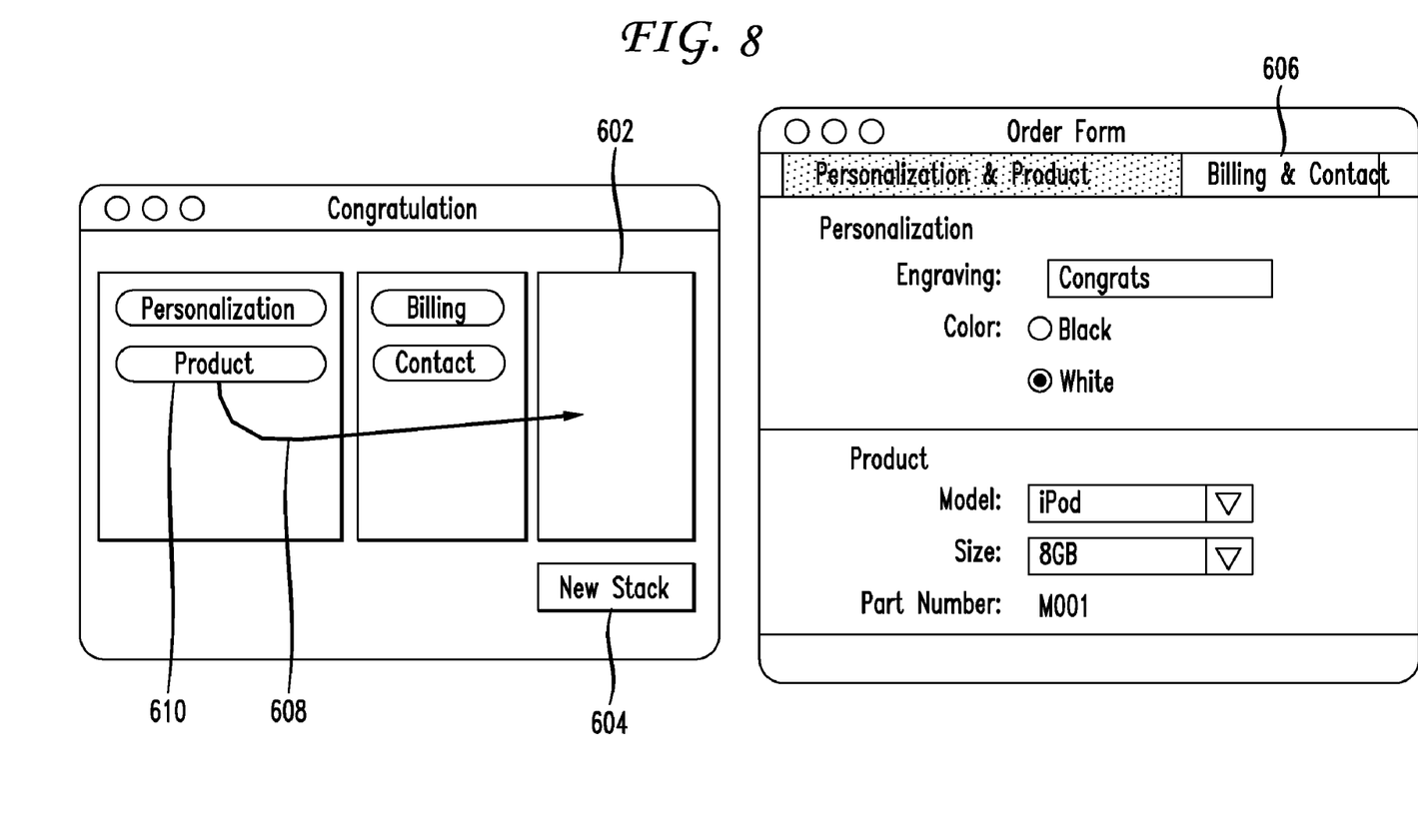
FIG. 8 illustrates another example configuration panel and the resulting changes made by moving tokens to a new stack.
Figure 9:
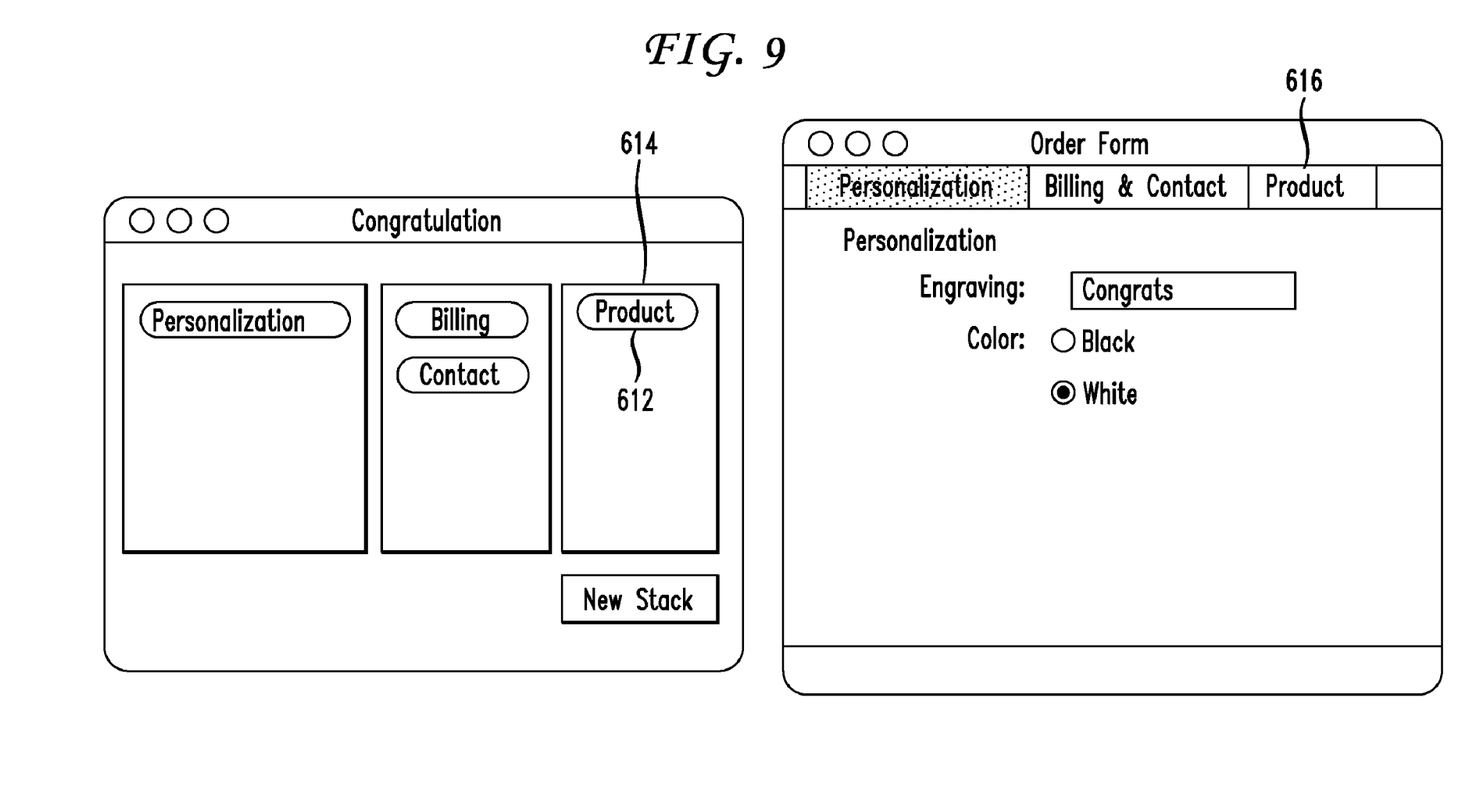
FIG. 9 illustrates another example configuration panel and the resulting changes made by moving tokens to a new stack.

FIGS. 8 and 9 illustrate another example configuration panel and the resulting changes made by moving tokens 610 to a new stack. The number of stacks is not fixed and can increase or decrease. However, individual applications or settings can limit the minimum and/or maximum number of stacks. The user can create additional containers, such as by clicking a button 604. Note that the navigation control 606 in the document window ignores and does not display a label for empty stack containers. In one aspect, the configuration window displays an additional empty container 602 into which a user drags 608 tokens 610 to activate the empty container. As the user drags tokens 610 into an empty container, the configuration window can prepare and display a new empty container, up to the maximum number of stacks or the maximum number of slices. As the user rearranges slices, if more than one containers are empty, the system can delete all the empty containers but one. Alternatively, the system can leave empty containers on the display or delete the empty containers. If automatic approaches to deleting empty containers are not used, then the user can provide input, such as clicking a delete button, to delete empty or non-empty containers from the configuration panel. When the user deletes a container which has slices, the system can delete those slices as well, move the slices to an available container, or prompt the user to choose what to do. Similarly, the system can provide a mechanism to create, define, and delete tokens representing slices. Slices can include sub-slices of user interface elements which a user can rearrange within the slice.

FIG. 9 illustrates the resulting changes in the user interface after the tokens are moved as shown with arrow 608 in FIG. 9. The Product token 612 is now located in the previously empty stack container 614. The navigation control 616 updates to display a third section labeled Product to indicate that the Product slice will be displayed if selected.

Figure 10:
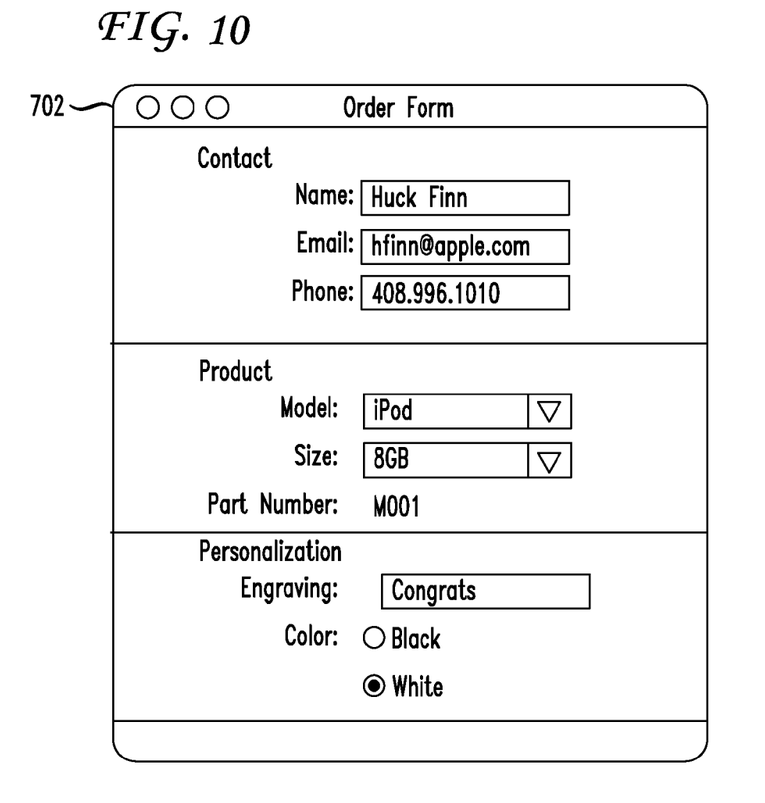
FIG. 10 illustrates a sample document type and the relation between document types with multiple documents.
Figure 11:
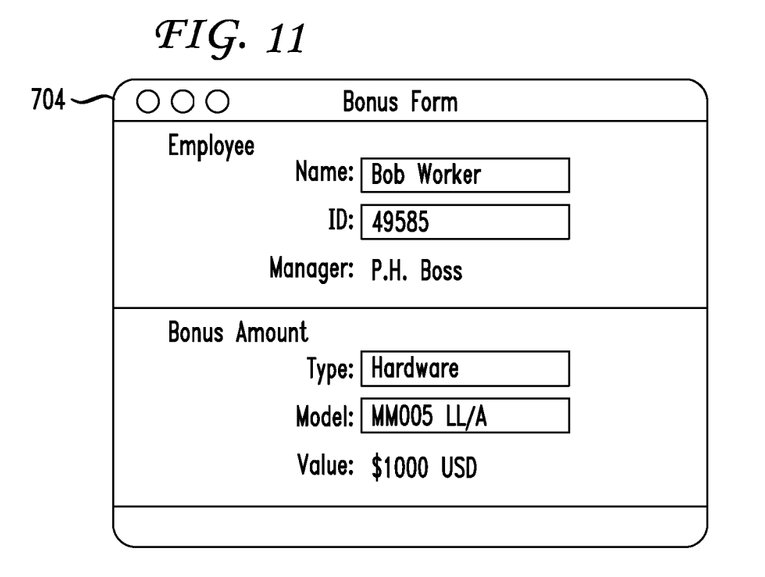
FIG. 11 illustrates a sample document type and the relation between document types with multiple documents.
Figure 12:
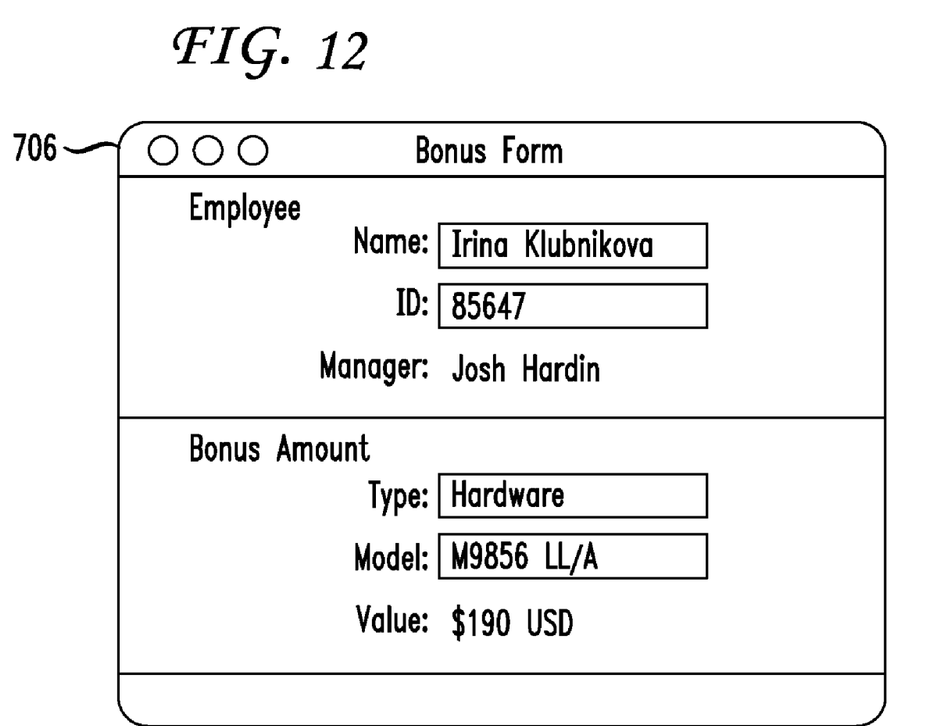
FIG. 12 illustrates a sample document type and the relation between document types with multiple documents.

FIGS. 10, 11, and 12 illustrate various sample document types and the relation between document types with multiple documents. Applications can present multiple types of documents 702, 704 to a user. Each of these document types can have multiple documents with unique sets of data 704, 706. For example, FIG. 10 shows a document type for ordering an item, while FIGS. 11 and 12 show another document type for granting a bonus, such as an employee bonus. Each of these document types displays different slices of data based on their use. Furthermore, a document type for disbursing a bonus (or any other document type) can include multiple documents which all use the same form type to display the same interface elements with different values. FIGS. 11 and 12 are both forms of the document type Bonus, and display the same interface with different values (e.g. $1,000 or $190, and ID 49585 or ID 85647) based on the specific document or user, for example.

Figure 13:
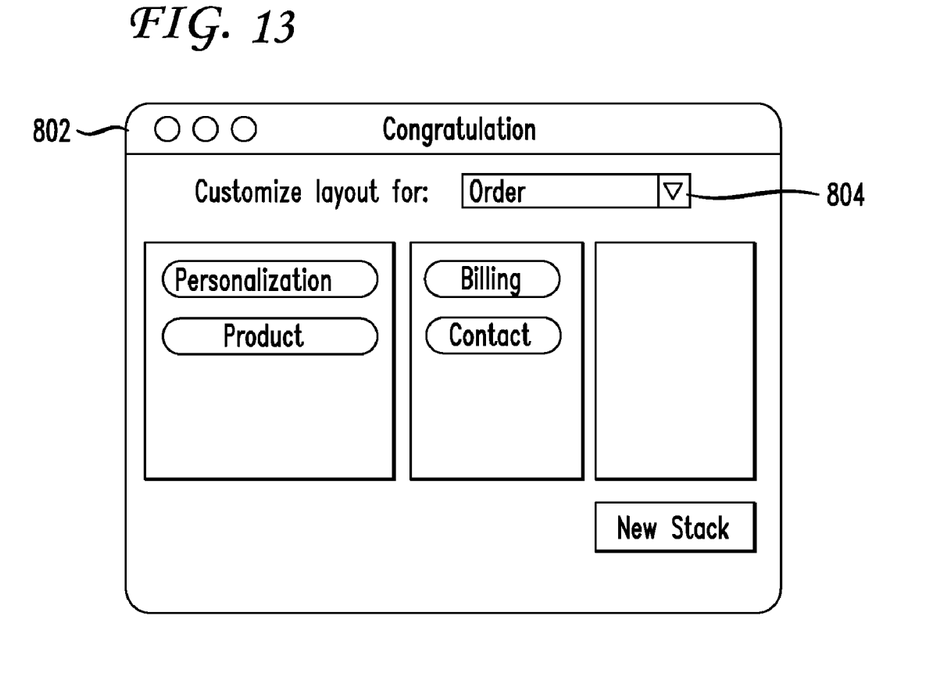
FIG. 13 illustrates a sample configuration panel to customize multiple document types.
Figure 14:
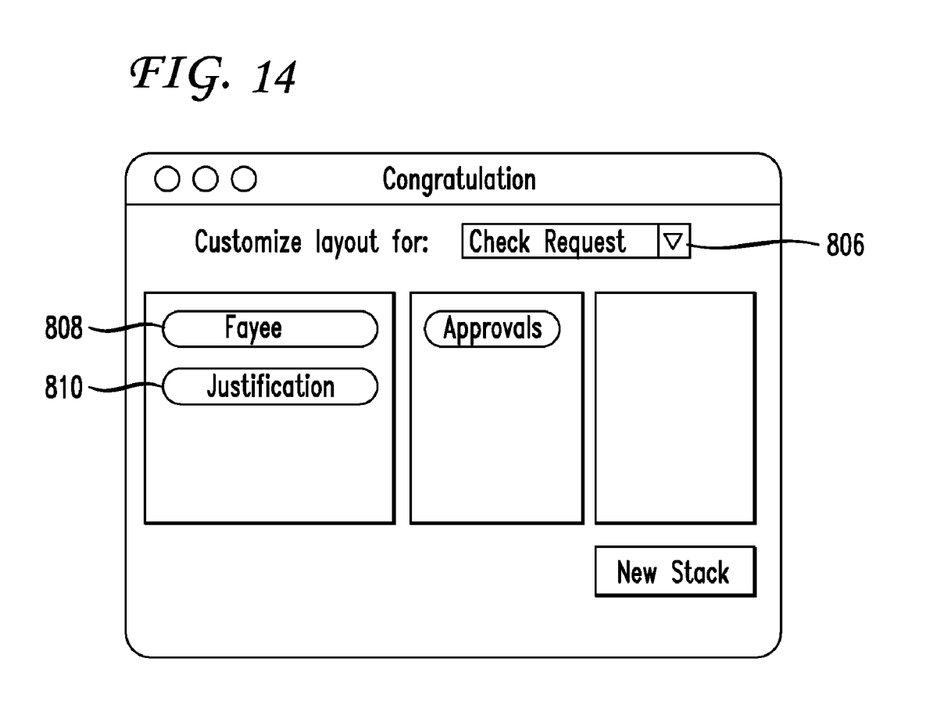
FIG. 14 illustrates a sample configuration panel to customize multiple document types.

FIGS. 13 and 14 illustrate a sample configuration panel to customize multiple document types. The user can specify a different slice configuration for each document type. The configuration window 802 displays a pull-down menu 804 or other control for the user to select the type of document. After the user selects a document type, the control 806 changes to reflect the selected type. Additionally, the stack containers 808 and tokens 810 change to represent the configuration for the selected document type. Document types can correspond to specific tasks, specific users, groups of users, a security level, or other variables. The system can automatically generate a default workflow arrangement of containers and slices based on the slices' contents or the title of the document type, for example. The system can include a button in the configuration window to revert to the default arrangement. The system can also provide template workflows. Users can design based on approved templates for unified, consistent appearance across many different applications and platforms.

Figure 15:
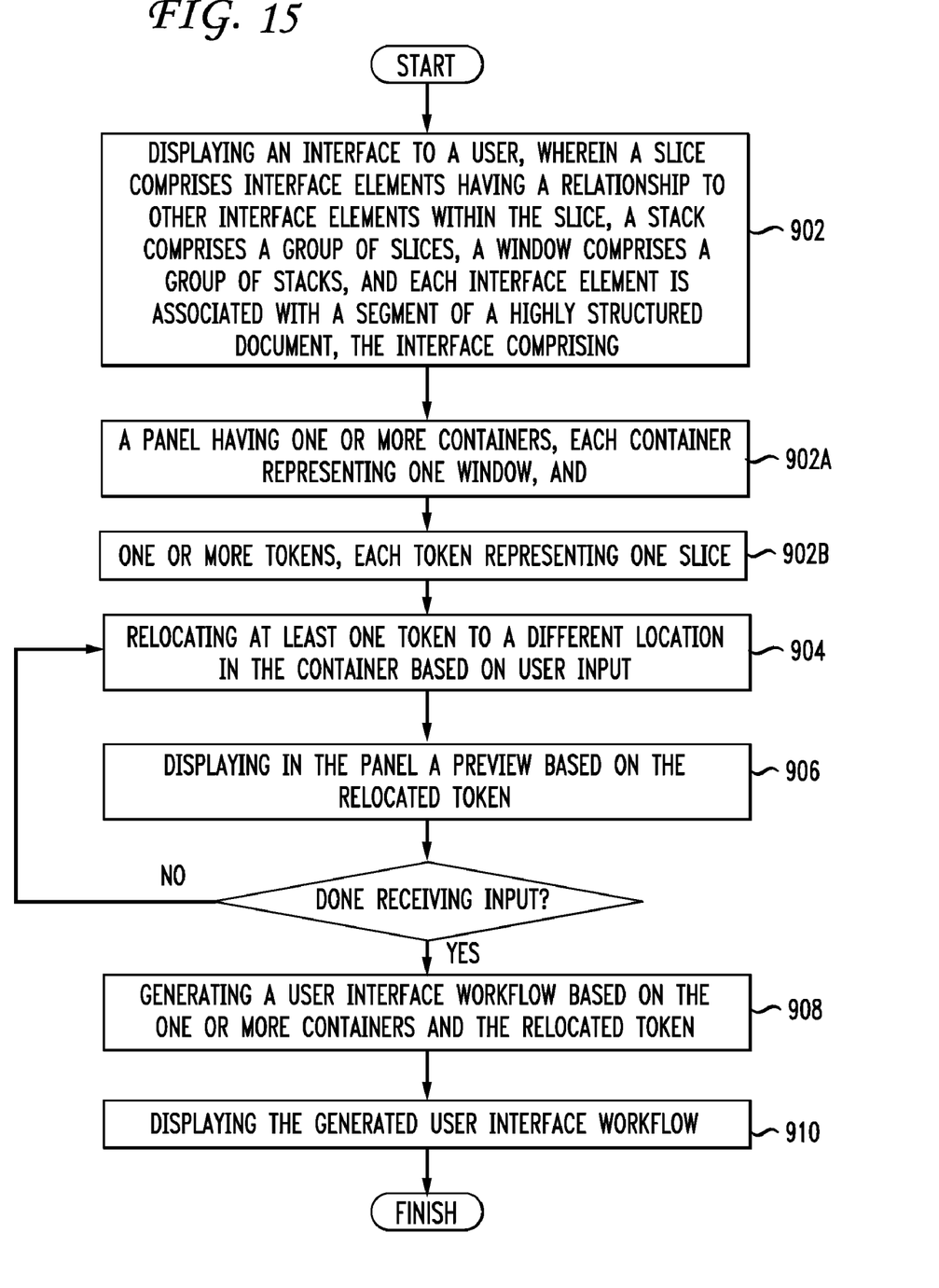
FIG. 15 illustrates an exemplary method embodiment.

The disclosure now turns to the exemplary method embodiment. For clarity, the method is discussed in terms of a system configured to practice the method. FIG. 15 illustrates an exemplary method embodiment. This method allows a user, such as a computer administrator or personal computer user, to specify the location and organization of information to support their workflow. Software developers develop applications for different types of users and for different types of jobs. For example, a build engineer may have a significant need for Release Notes. If this section is typically located at the bottom of the application window, the build engineer must scroll down every time he or she opens the application. This method allows the user to move the Release Notes slice to the top of the form for easy access.

In this system, a slice includes interface elements having a relationship to other interface elements within the slice, a stack includes a group of slices, and a window includes a group of stacks. The system first displays, via a processor, an interface to a user (902). A slice includes interface elements with a relationship to other interface elements within the slice. A stack is a group of slices. A window is a group of stacks, and each interface element is associated with a segment of a highly structured document. The interface includes a panel having one or more containers, each container representing one window (902a) and one or more tokens, each token representing one slice (902b). The system relocates at least one token to a different location in the container based on user input (904), and displays a preview in the panel based on the relocated token (906). The system can, at this point, receive further user input indicating that the user is finished moving tokens. Without this user input, the system can return to step (904). If the user indicates that he or she is finished, the system can generate a user interface workflow based on the one or more containers and the relocated token (908) and display the generated user interface workflow (910).

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the disclosure. For example, the principles herein may be applied to desktop interfaces, mobile device interfaces, textual and graphical interfaces, and touch interfaces. Those skilled in the art will readily recognize various modifications and changes that may be made to the present disclosure without following the example embodiments and applications illustrated and described herein, and without departing from the true spirit and scope of the disclosure.

We claim:

1. A computer-implemented method of customizing a user interface, the method comprising:
 displaying a configuration panel to a user, the configuration panel representing a user interface, wherein a slice comprises user interface elements having a relationship to other user interface elements within the slice, a stack comprises a group of slices, a window comprises a group of stacks, and each user interface element is associated with a segment of a highly structured document, the configuration panel comprising:
  one or more containers, each container representing one stack, and
  one or more tokens, each token representing one slice;
 relocating at least one token to a different location in a container based on user input, the user input comprising dragging the at least one token and dropping it in a different location in the container, wherein the relocating causes at least one slice represented by the at least one token to be relocated to a different location in a stack represented by the container;
 displaying in the user interface a preview based on the at least one relocated token, wherein the preview reflects the at least one relocated slice;
 automatically updating a user interface workflow for user interface elements based on the one or more containers and the at least one relocated token, wherein the user interface workflow is an ordered sequence of input fields;
 displaying the updated user interface;
 monitoring a user history; and
 suggesting changes to the user interface workflow associated with the user based on the user history.

2. The computer-implemented method of claim 1, the method further comprising generating additional user interface workflows based on additional input.

3. The computer-implemented method of claim 2, wherein additional user interface workflows are associated with a user ID.

4. The computer-implemented method of claim 2, wherein the additional user interface workflows are associated with a user class.

5. The computer-implemented method of claim 1, wherein generating the user interface workflow is further based on modifying a default workflow based on the group of slices.

6. The computer-implemented method of claim 1, wherein one slice further comprises a group of sub-slices.

7. The computer-implemented method of claim 6, the method further comprising constraining sub-slices to a same slice.

8. A tangible computer-readable storage medium storing a computer program having instructions for controlling a processor to customize a user interface, the instructions comprising:
 displaying a configuration panel to a user, the configuration panel representing a user interface, wherein a slice comprises interface elements having a relationship to other interface elements within the slice, a stack comprises a group of slices, a window comprises a group of stacks, and each interface element is associated with a segment of a highly structured document, the configuration panel comprising:

one or more containers, each container representing one stack, and one or more tokens, each token representing one slice;

relocating at least one token to a different location in a container based on user input, the user input comprising dragging the at least one token and dropping it in a different location in the container, wherein the relocating causes at least one slice represented by the at least one token to be relocated to a different location in a stack represented by the container;

displaying in the user interface a preview based on the at least one relocated token, wherein the preview reflects the at least one relocated slice;

automatically updating a user interface workflow for user interface elements based on the one or more containers and the at least one relocated token, wherein the user interface workflow is an ordered sequence of input fields;

displaying the updated user interface;

monitoring a user history; and suggesting changes to the user interface workflow associated with the user based on the user history.

9. The computer-readable storage medium of claim 8, the instructions further comprising creating a new container in the panel based on additional user input.

10. The computer-readable storage medium of claim 8, the instructions further comprising deleting a selected container in the panel based on additional user input.

11. The computer-readable storage medium of claim 8, the instructions further comprising:
creating a new token based on additional user input; and
inserting a new segment in the highly structured document corresponding to the new token.

12. The computer-readable storage medium of claim 8, the instructions further comprising deleting a selected token based on additional user input.

13. The computer-readable storage medium of claim 8, wherein displaying the generated user interface workflow wherein stacks further comprise non-slice-based user interface elements.

14. The computer-readable storage medium of claim 8, the instructions further comprising locking related slices such that the locked slices must be placed together in a same stack.

15. A system for customizing a user interface, the system comprising:
a processor;
a display module configured to control the processor to display a configuration panel to a user, the configuration panel representing a user interface, wherein a slice comprises user interface elements having a relationship to other user interface elements within the slice, a stack comprises a group of slices, a window comprises a group of stacks, and each user interface element is associated with a segment of a highly structured document, the configuration panel comprising:

one or more containers, each container representing one stack, and one or more tokens, each token representing one slice;

a relocation module configured to control the processor to relocate at least one token to a different location in a container based on user input, the user input comprising dragging the at least one token and dropping it in a different location in the container, wherein the relocating causes at least one slice represented by the at least one token to be relocated to a different location in a stack represented by the container;

the display module being further configured to control the processor to display in the user interface a preview based on the at least one relocated token, wherein the preview reflects the at least one relocated slice;

a generation module configured to control the processor to automatically update a user interface workflow for user interface elements based on the one or more containers and the at least one relocated token, wherein the user interface workflow is an ordered sequence of input fields;

the display module being further configured to control the processor to display the updated user interface;

a monitoring module configured to control the processor to monitor a user history; and a suggestion module configured to control the processor to suggest changes to the user interface workflow associated with the user based on the user history.

16. The system of claim 15, wherein the generation module does not include empty containers in the user interface workflow.

17. The system of claim 15, wherein the display module is further configured to display the preview in real time.

18. The system of claim 15, wherein the display module is further configured to display a real time preview of the updated user interface.

19. The system of claim 15, the system further comprising a tab smoothing module configured to control the processor to automatically update a tab order of slices based on slices' graphical layout.

20. The system of claim 15, wherein one container holds up to a maximum number of slices.

21. The system of claim 15, the system further comprising an authentication module configured to control the processor to authenticate the user and allow access to the highly structured document based on user authentication.

22. The system of claim 15, wherein the suggestion module is further configured to control the processor to suggest changes based on interface efficiency.

23. The system of claim 15, wherein the user interface workflow includes duplicate entries of a same slice in different locations in the updated user interface.

24. The system of claim 15, wherein the user interface workflow is retrieved from a local device.

25. The system of claim 15, wherein the user interface workflow is retrieved from a remote device.

* * * * *